United States Patent [19]

Thomas et al.

[11] Patent Number: 5,304,927
[45] Date of Patent: Apr. 19, 1994

[54] METHOD AND APPARATUS FOR MONITORING A SERIES OF PRODUCTS

[75] Inventors: Neil E. Thomas, St. Albans; Clive F. Kittel, Kimpton; Robert M. Averill, Irthlingborough; Christopher Marcus, Egham; Ian W. D. Cox, Gerrards Cross, all of Great Britain

[73] Assignee: Cintex Limited, Surrey, Great Britain

[21] Appl. No.: 623,425

[22] PCT Filed: Mar. 29, 1990

[86] PCT No.: PCT/GB90/00469
§ 371 Date: Feb. 4, 1991
§ 102(e) Date: Feb. 4, 1991

[87] PCT Pub. No.: WO90/12316
PCT Pub. Date: Oct. 18, 1990

[30] Foreign Application Priority Data

Mar. 30, 1989 [GB] United Kingdom ............... 8907229

[51] Int. Cl.⁵ ..................... G01N 27/72; G01R 33/12
[52] U.S. Cl. ..................... 324/233; 324/239
[58] Field of Search ............... 324/225, 233, 239, 241, 324/242, 243; 340/939, 941, 551, 572; 209/567, 570

[56] References Cited

FOREIGN PATENT DOCUMENTS

| 0107158A2 | 5/1984 | European Pat. Off. |
| 0208214A2 | 1/1987 | European Pat. Off. |
| 0308073A2 | 3/1989 | European Pat. Off. |
| WO81/01198 | 4/1981 | PCT Int'l Appl. |
| WO85/00428 | 1/1985 | PCT Int'l Appl. |
| 1495759 | 12/1977 | United Kingdom |
| 2025630A | 1/1980 | United Kingdom |
| 2131994A | 6/1984 | United Kingdom |
| 2156528A | 10/1985 | United Kingdom |

Primary Examiner—Walter E. Snow
Attorney, Agent, or Firm—Frishauf, Holtz, Goodman & Woodward

[57] ABSTRACT

Monitoring a series of products of the kind in which the presence of foreign bodies in the product being monitored is detected by the characteristic magnetic field phase difference each material exhibits. The signal generated by a satisfactory product having no foreign body in it is used as the datum for judging whether the next subsequent product is free from a foreign body or not.

10 Claims, 9 Drawing Sheets

CARBON STEEL

ALUMINIUM

BREAD

METHOD AND APPARATUS FOR MONITORING A SERIES OF PRODUCTS

This invention relates to a method and apparatus for monitoring a series of products.

The invention is particularly applicable to the monitoring of mass-produced food products, such as loaves of bread, sausages, frozen chickens and so on, but is also applicable to the monitoring of other articles. The invention is particularly useful for the detection of metallic foreign bodies in such articles, but is not limited to such uses.

It is known to monitor food products by passing them through what is referred to as a metal detecting apparatus. The apparatus has a drive coil driven by alternating signal which produces an oscillating magnetic field, and a pair of detection coils connected in a precision balanced circuit, so that in the absence of a product in a detection zone in the vicinity of the coils a null detection signal is output from the detection coils. The drive signal and detection signal are fed to a phase detection circuit, which produces a pair of signals indicative of the detection signal component in phase with the drive signal and the detection signal component 90 degrees out of phase from the drive signal. From these two signals the phase difference between the detection signal and the drive signal can be determined. When a product is placed in the detection zone, a phase difference arises. For a series of identical products the phase difference for each is substantially the same. Furthermore, if the only difference between products in a series is their size, then the phase differences for the products are still substantially the same. However, if one of the products, say a loaf of bread, contains a foreign body, such a steel bolt, then a different phase difference will arise. Thus, in the known apparatus, the determined phase difference is compared with a pre-set value, and if there is a difference of more than a preset threshold value, an alarm signal is output.

In the known apparatus, the comparison value and threshold value are preset in accordance with the type of product. Although the phase differences produced for a series of apparently identical products are similar, slight variations do arise, and it is therefore necessary in the known apparatus to set the threshold value to a larger than ideal value in order to prevent spurious rejection of products, but thereby increasing the risk of accepting a contaminated product. The present invention evolves in part from a realisation by the inventors that the phase differences for a series of acceptable products do not, in most circumstances, change greatly from one product to the next in a series, even though there may be a more pronounced change over a long period of time. Various reasons for this phenomenon have been determined by the inventors; a major reason being change in temperature of the products, resulting in a change in phase difference, but other parameters may also have an effect. As one example, a sausage making machine and the sausages produced thereby may rise in temperature during a day's work as the machine "warms up". Also, the ambient temperature of the workplace may change during the day and have an effect on the phase difference. As a further example, a large batch of loaves taken from an oven at one time and then passed through the apparatus one after the other will be at progressively diminishing temperatures.

In accordance with one aspect of the present invention, the comparison value is updated automatically when an acceptable product is detected, in dependence upon the detected phase difference for the acceptable product. Accordingly, account is taken of progressive small changes in the phase difference for acceptable products, and therefore a smaller threshold value can be chosen, thus increasing sensitivity without increasing the risk of accepting unacceptable products.

The invention may also include the feature that, at the start of a series of products, a routine is provided whereby a few products can be detected and the initial comparison value is calculated from the results for those products.

The invention may also be used to monitor the state or condition of a series of products, such as the degree to which a product has been frozen.

A specific embodiment of the present invention and modifications thereto will now be described by way of example with reference to the accompanying drawings, in which.

Figure 1:
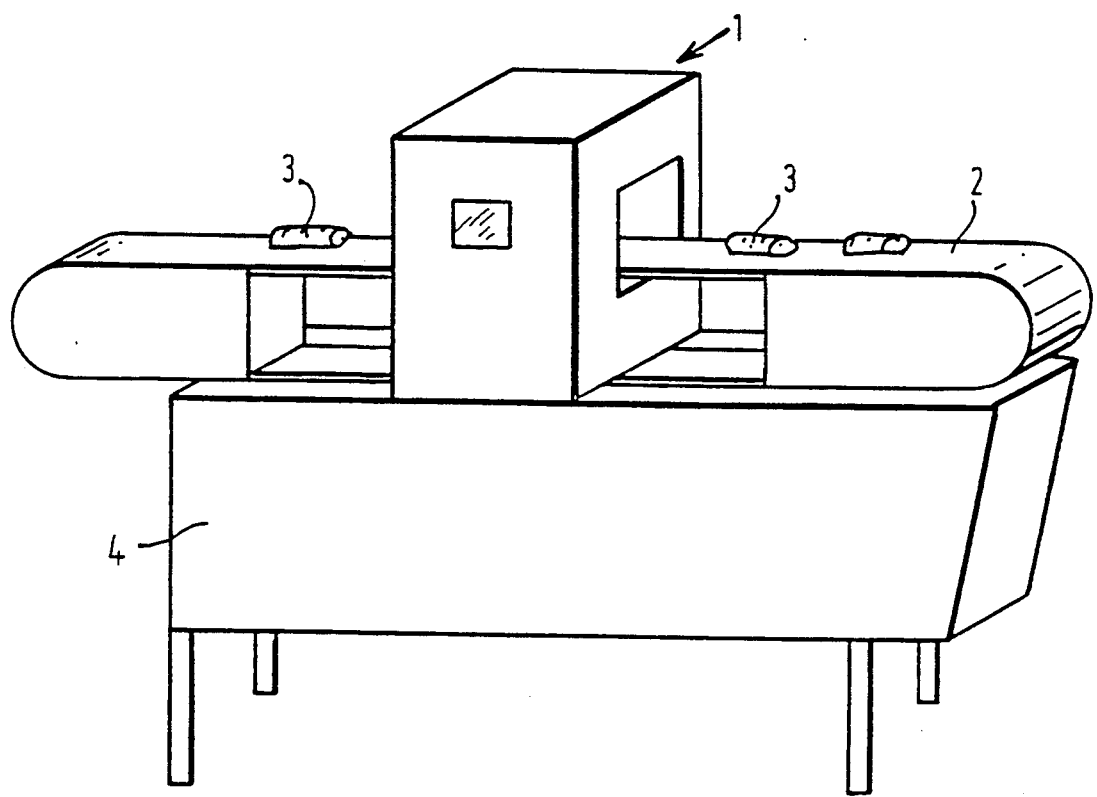
FIG. 1 is a perspective view showing one embodiment of the present invention.

FIG. 1 shows apparatus for monitoring a series of products in order to ascertain whether they contain foreign bodies, such as metal particles. The apparatus comprises a unit 1 through which the products 2 pass on a conveyor belt 3, the whole assembly being mounted upon a table 4. The unit 1 consists essentially of a magneto-electrical detection arrangement, (which will be described in more detail with reference to the following figures) the purpose of which is to produce a signal which is indicative of whether or not the product 2, in this case a loaf of bread, contains any foreign bodies. The invention will now be described in more detail with reference to the FIGS. 2 to 10.

Figure 2:
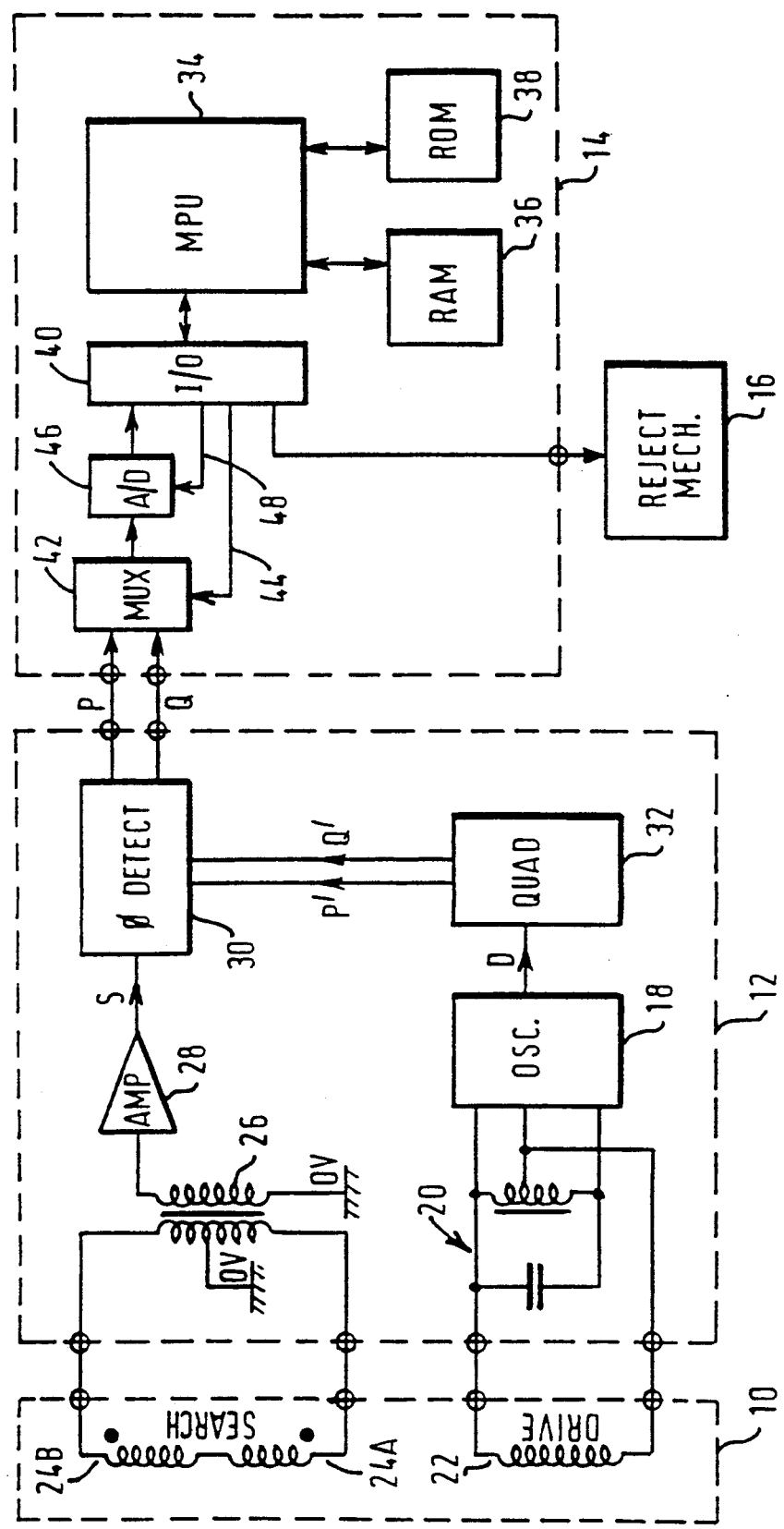
FIG. 2 is a block diagram illustrating a product monitoring apparatus as shown in FIG. 1.

Referring to FIG. 2, an apparatus according to the invention includes four sections: a coil section 10; a driver and detection circuitry section 12; a computer section 14; and a reject mechanism 16.

Figure 9:
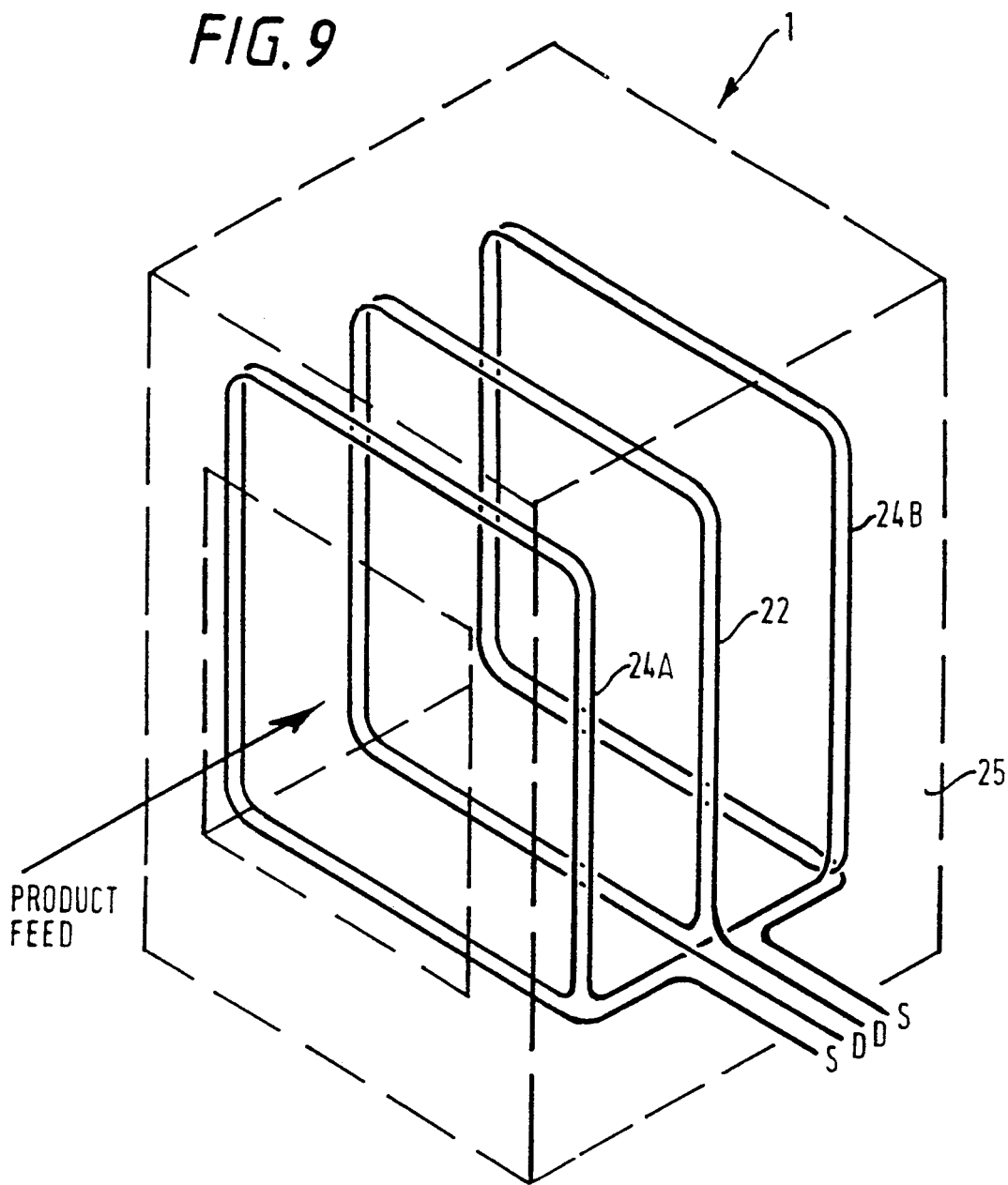
FIG. 9 is a schematic perspective view of drive and search coils used in the apparatus of FIG. 2.

The section 12 includes an oscillator 18 and associated circuitry 20 which supply an AC drive signal typically of 500 kHz and 25 V to a drive coil 22 in the coil section 10. Spatially positioned to either side of, and co-axially with, the drive coil 22 are a pair of balanced, oppositely-wound series-connected search coils 24A, 24B. Typically, the drive and search coils are about 120 to 600 mm in diameter (or similar size but rectangular) and each has one or two turns. As shown in FIG. 9, the coils are potted in epoxy resin 25. During product monitoring, the products are passed through the coils in the axial direction thereof. The search coils are connected via a balance transformer 26 to the input of an amplifier 28, the output of which is connected to a phase detector 30. The oscillator 18 also supplies a signal D, in phase with the signal to the drive coil 22, to the input of a quadrature generator 32, which supplies two signals in quadrature to the phase detector 30, that is a signal P' in phase with the drive coil signal, and a signal Q' which is 90 degrees out of phase from the drive coil signal. The phase detector 30 serves to output two signals P, Q which are the amplitudes of the components of the detected signal S which are respectively in phase with, and 90 degrees out of phase from, the drive coil signal.

Figure 3A:
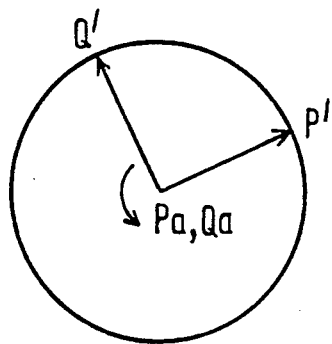
FIG. 3A to FIG. 3D are vector diagrams in a real-imaginary plane illustrating signals arising in the apparatus of FIG. 2.
Figure 3B:
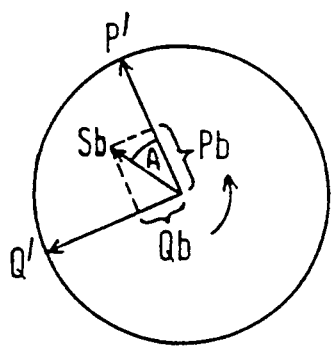

Referring to FIG. 3, if one considers the signals P', Q', S to be rotating vectors in a real-imaginary plane then as shown in FIG. 3A when the detected signal S is zero, the output signals Pa, Qa in the case of FIG. 3A are zero. As a product is passed through the coils, a non-zero detection signal will arise, shown as Sb in FIG. 3B, and output signals Pb, Qb will occur. As the detection signal S rises and subsequently falls (FIGS. 3C and 3D) the output signal P, Q will also rise and fall (see magnitudes Pc, Qc and Pd, Qd). It should be noted however, that for a particular product, the phase angle A between the detection signal vector Sb, Sc, Sd and the P' signal vector remains substantially constant, shown as angle A in FIGS. 3B to 3D.

Figure 3C:
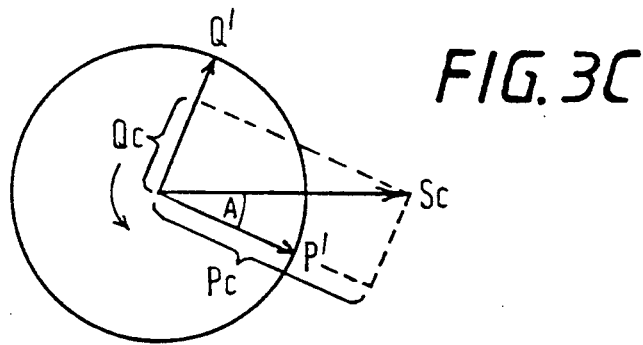
Figure 3D:
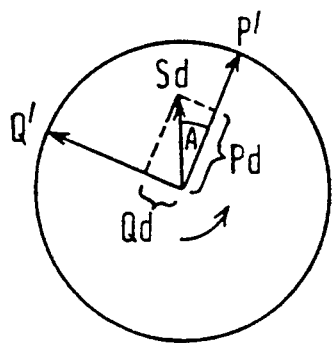
Figure 4A:
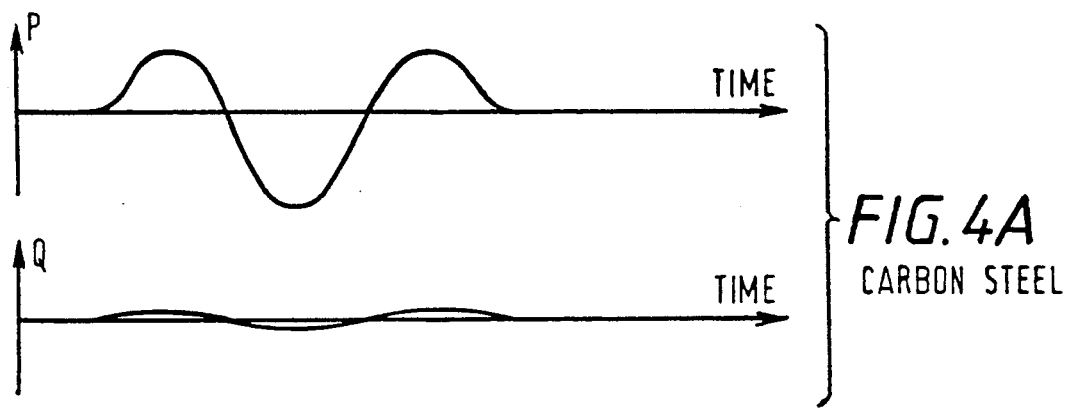
FIG. 4A to FIG. 4C are voltage-time diagrams illustrating signals arising in the apparatus for different types of materials.
Figure 4B:
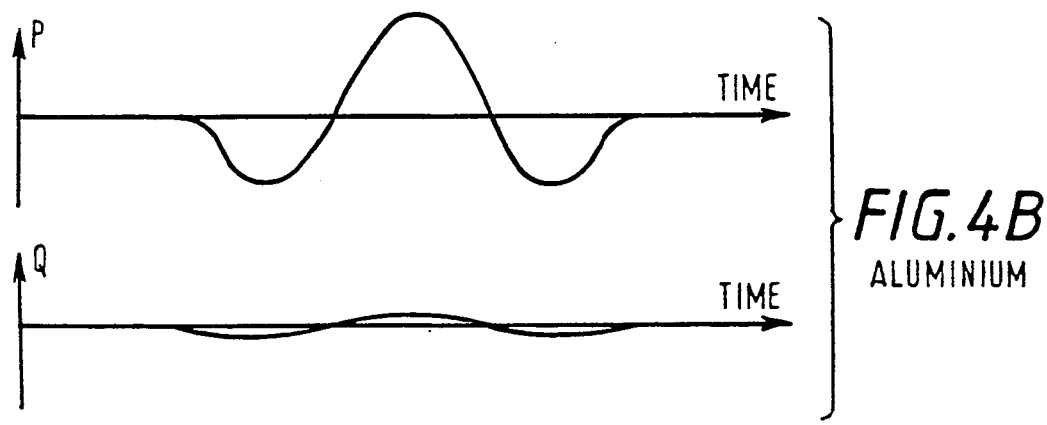
Figure 4C:
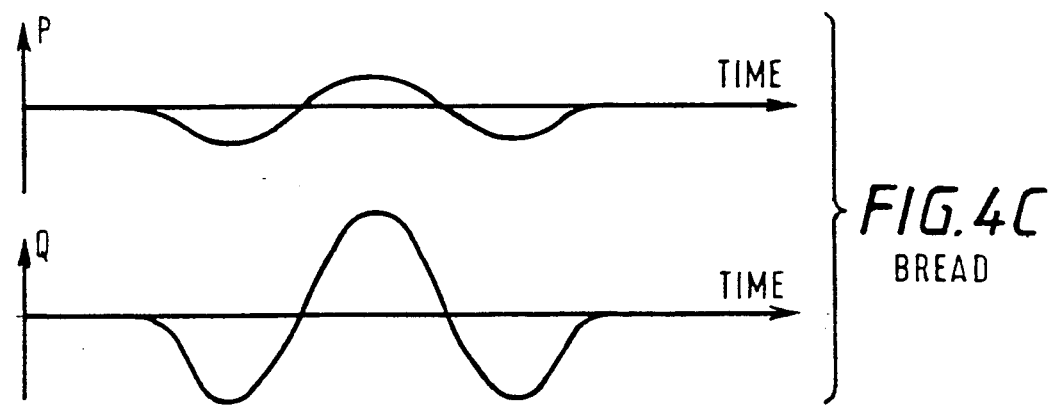

Using an arrangement of one drive coil and two search coils, as described above, three peaks are, in fact, produced in the P and Q signals as each product is passed through the coil section, and examples of the P and Q signals for three different materials are illustrated in FIGS. 4A to 4C. As shown in FIG. 4A, for a carbon steel article (ferromagnetic), the P signal is many times greater than the Q signal, and the peaks are in the order +, −, +. For an aluminium article (diamagnetic), the P signal is also many times greater than the Q signal, but the peaks are in the order −, +, −, as shown in FIG. 4B. For products such as bread, meat, butter, cereals, there are peaks in both the P and Q signals, and FIG. 3C illustrates the P and Q signals for bread. In the case where a loaf of bread contains a foreign body of carbon steel, the P and Q signals would be generally as shown in FIGS. 4C, but also containing a small component of the signals as shown in FIG. 4A, and it is these additional small components which the apparatus must be able to detect reliably.

Referring back to FIG. 2, the compter section 14 comprises: a microprocessor unit 34 with associated RAM 36, ROM 38 and input/output port 40; a 2:1 multiplexer 42 which selects the signal P or Q in accordance with a sample select signal 44 from the I/O port 40, and an analogue-to-digital converter 46 which digitises the selected signal under control of a read signal 48.

Figure 5:
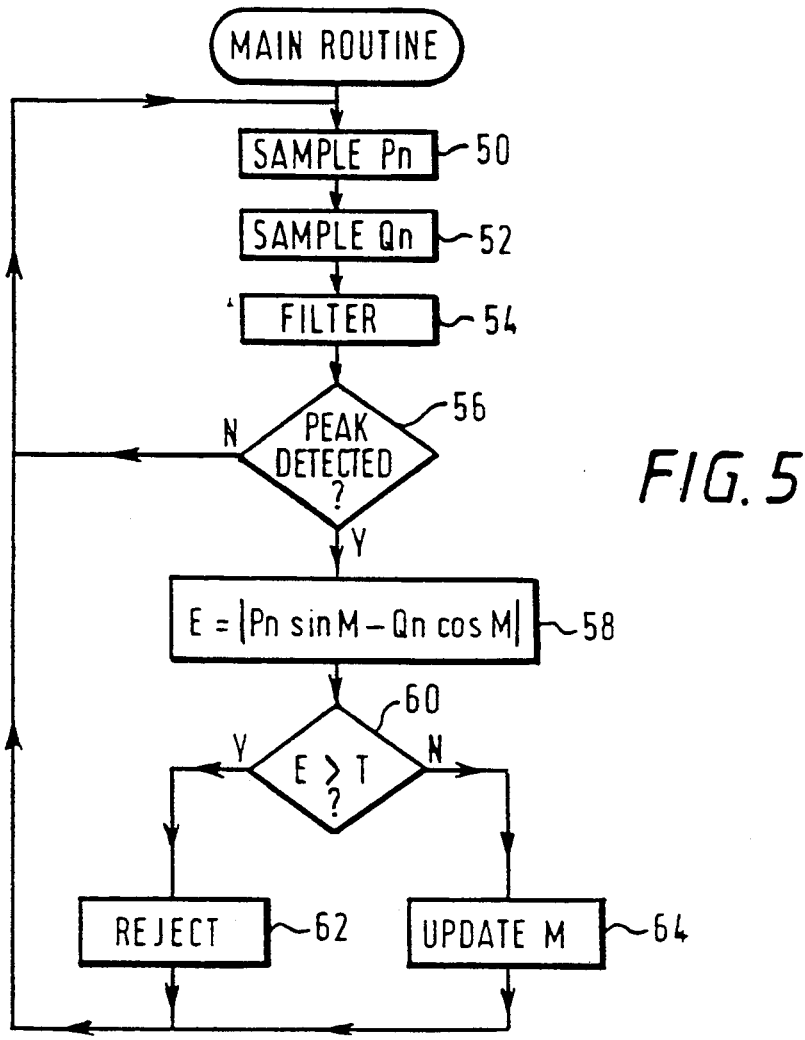
FIG. 5 is a flow diagram of a main routine performed by a microprocessor unit in the apparatus of FIG. 2.

The routine performed by the MPU 34 is shown in FIG. 5. In steps 50 and 52 samples Pn and Qn of the P and Q signals are taken using the multiplexer 42 and A/D converter 46. These samples are digitally filtered at step 54 using a three-stage filter comprising two running sum filters and a comb filter to reduce noise in small signals. At step 56, it is decided whether the P or Q signal has peaked, using an algorithm described below, and if not, then the routine returns to step 50. However, if a peak has been reached then in step 58, an error value is calculated by the equation:

$$E = |Pn \cdot \sin M - Qn \cdot \cos M|$$

where M is the expected phase angle for the product in question, and is updated from time to time as described below. It will be appreciated that if Pn, Qn comply exactly with the expected phase angle, that is if arctan(Qn/Pn)=M, then E will be zero. In step 60, it is decided whether the error value E is less than a preset threshold value T representing an acceptable product. If not, then a reject step 62 follows in which, for example, the reject mechanism 16 is operated to divert the product to a reject bin, or, for example, a warning signal is given to the machine operator. In step 60, if the error value E is less than the threshold value T, then step 64 follows, described in detail below, to update the value M. After step 62 or 64, the routine returns to step 50.

Figure 6:
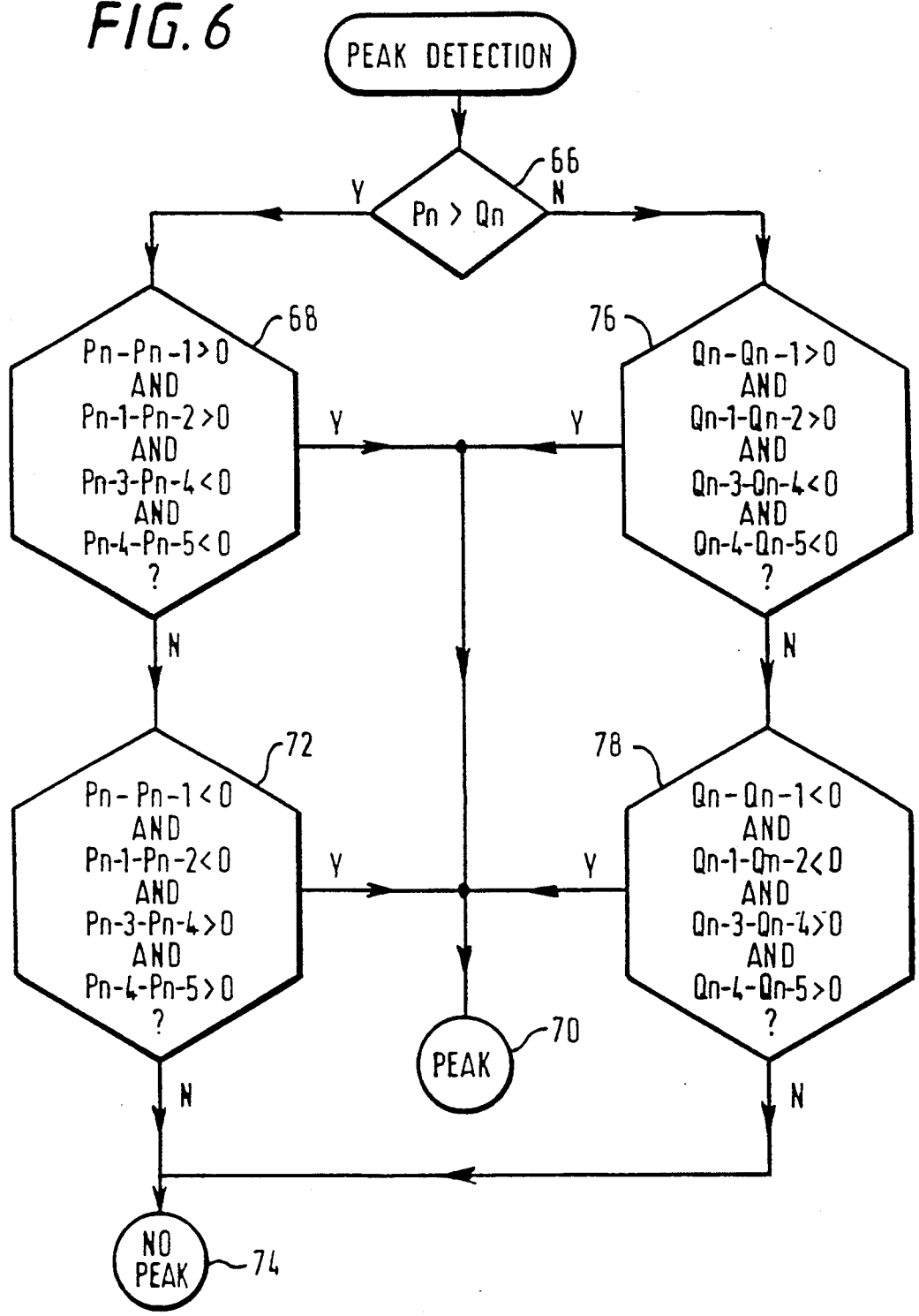

The subroutine of the peak detection step 56 is shown in FIG. 6. In step 66, it is determined whether the current sample Pn is larger than the current sample Qn, because the larger one is used to determine whether there is a peak. (Referring to FIG. 4A, a peak can more reliably be detected in the P signal than in the Q signal, but in FIG. 4C a peak can more reliably be detected in the Q signal). If Pn>Qn then in step 68, it is determined whether, over the last six samples of P, the earliest three samples show two consecutive decreases in P and the most recent three samples show two consecutive increases in P. If so, then this is indicative of a negative peak and the subroutine proceeds to the "yes" termination 70. If not, then in step 72 it is determined whether the earliest three samples show two consecutive increases in P and the latest three sample show two consecutive decreases in P. If so, then this indicates a positive peak in P, and the subroutine proceeds to the "yes" termination 70, and if not, to the "no" termination 74. If in step 66, it is determined that Pn is not greater that Qn, then steps 76, 78 follow similar to steps 68, 72 respectively, but in respect of the last six values of Q rather than P.

Figure 10:
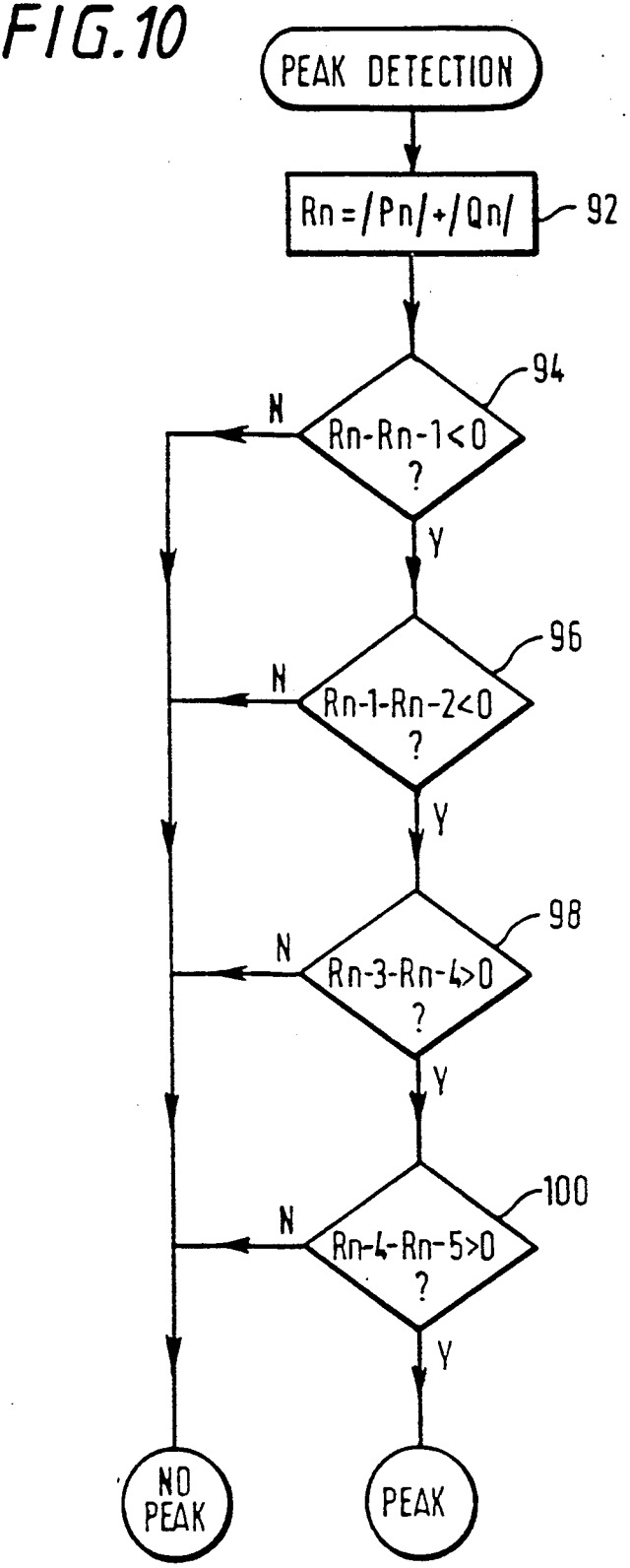
FIG. 10 is an alternative sub-routine to that shown in FIG. 6.

Alternative but similar peak detection algorithms may, of course, be used, for example as shown in FIG. 10. In step 92, a value Rn is calculated as the sum of the moduli of the current samples of Pn and Qn. The steps 94 to 100 then follow which are similar to step 72 in FIG. 6, but in respect of the values R(n−5) to Rn, rather than values P(n−5) to Pn.

Figure 7:
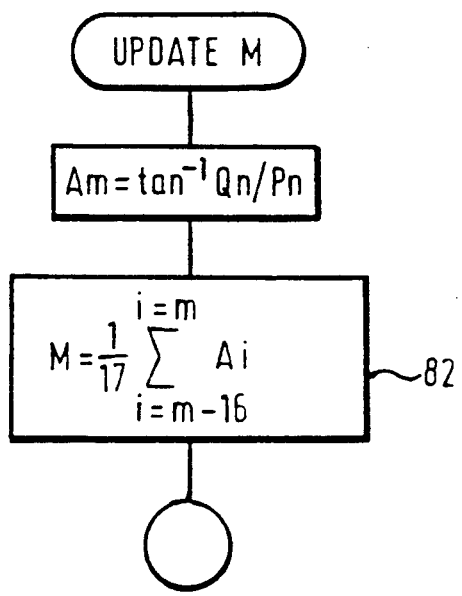
FIGS. 6 and 7 are flow diagrams of sub-routines of the main routine shown in FIG. 5.

The subroutine for updating the value M is shown in FIG. 7. It will be recalled that this subroutine is performed only if the currently tested product proves to be acceptable and is not rejected. In step 80, the phase angle Am represented by the current values Pn, Qn is calculated by the equation Am=arctan (Qn/Pn). The previous sixteen values A(m−17) to A(m−1) of A, having been stored in the RAM, are then used, together with the current value Am, in calculating the arithmetic mean value M, in step 82.

Figure 8:
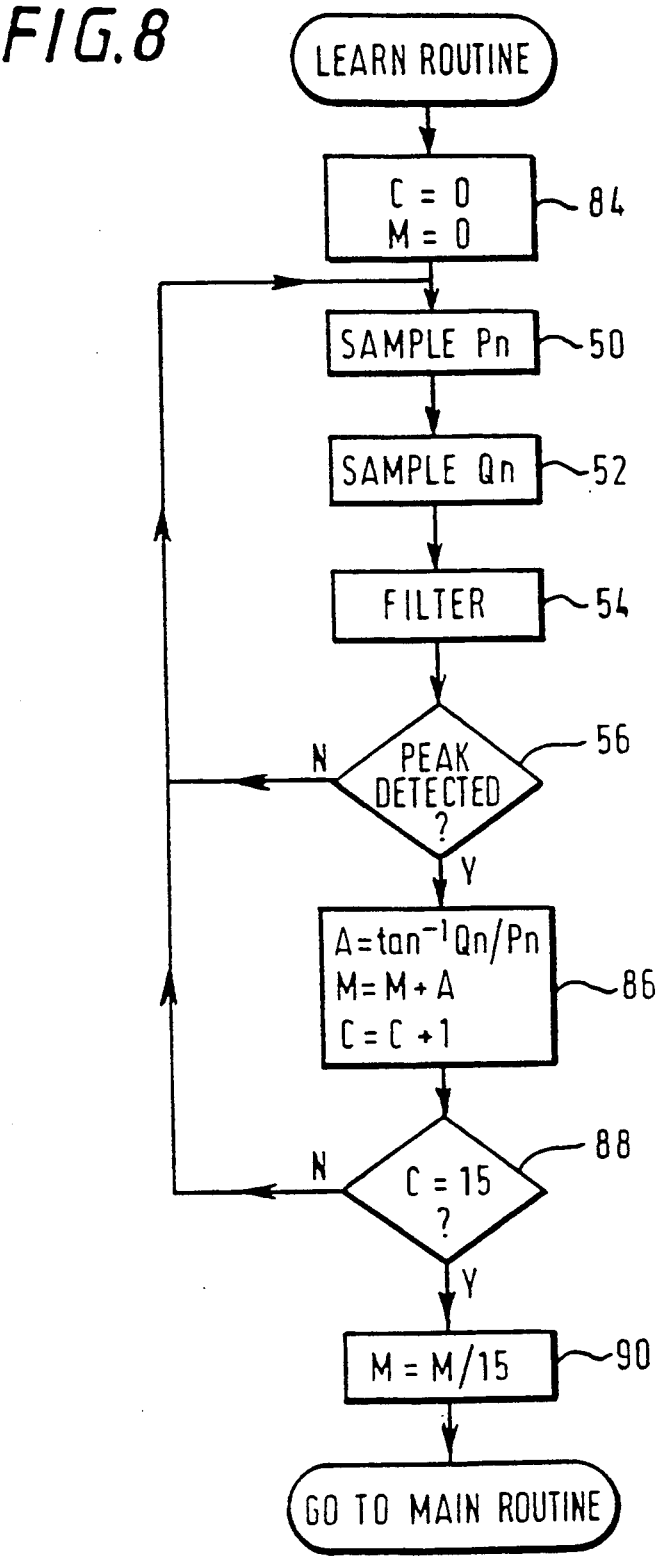
FIG. 8 is a flow diagram of a learn routine which may precede the main routine of FIG. 5.

In order to set the value of M initially the MPU 34 may be arranged on command from a keyboard (not shown) to perform a learn routine, as shown in FIG. 8. At step 84, a counter value C and the value M are zeroed. Steps 50, 52, 54 and 60 then follow, similar to the corresponding steps described above with reference to FIG. 5. If no peak is detected, then from step 56, the routine loops back to step 50. If, however, a peak is detected, in step 86 the phase angle A is calculated; this value A is added to the value M, and the counter value C is incremented. In step 88, it is determined whether the counter value is 15, and if not the routine loops back to step 50. If however, C=15, that is to say fifteen peaks (corresponding to five products) have been detected, then the value M is divided by 15 in step 90, so that the value M becomes the arithmetic mean phase angle for those five products. The main routine shown in FIG. 5 may then be commenced.

As an alternative to the self-learning capability described above for initially calculating the value of M, the value may be manually entered using the keyboard. Furthermore, when the apparatus is switched off, the current value of M may be stored in non-volatile memory, ready for use when the apparatus is subsequently switched on.

In a modification of the above method and apparatus, mean phase angles can be stored (and updated) for two or more different types of product, and each time a product is detected, the values of P and Q can be checked against both mean phase angles, thus enabling a single apparatus to be used for multiple products.

It will be appreciated that the apparatus and method described above provide a number of important advantages, including:

digital processing of the detected values;
the use of peak values in the P and Q signals for high signal-to-noise ratio;
the ability to take account of long term changes in phase angle;
the ability to choose a small threshold value T without causing spurious rejection of products, and thus provide increased sensitivity;
self learning capability; and
testing of multiple types of product.

Furthermore the apparatus and method of the present invention can be used to obtain information about a product other than whether or not it contains a foreign body.

The numerical information provided by the P and Q signals, the nulling phase and the processed metal signal may enable information to be provided concerning the type and size of any contaminants present.

The method and apparatus could also be used to deduce information about the product itself. For example if the product is frozen chicken pieces the data obtained is dependant upon whether the chicken pieces are fully frozen e.g. only frozen on the outside but not on the inside. The data could thus be used to indicate a products condition.

We claim:

1. A method of monitoring a series of products, comprising the steps of:
   (a) generating an alternating magnetic field in a monitoring zone;
   (b) placing a product in the monitoring zone;
   (c) detecting a magnetic field in the monitoring zone;
   (d) comparing a stored value indicative of an acceptable phase difference with a detected value indicative of a phase difference between the detected and the generated magnetic fields and producing an output signal in dependence upon a result of the comparison, said output signal providing information on both the product in the monitoring zone and any impurities detected therein;
   (e) automatically updating the stored value in dependence upon the detected value if the detected value is indicative of a phase difference that is representative of an acceptable product; and
   (f) repeating steps (b) to (e) for a further product.

2. A method as claimed in claim 1, further comprising the step of (c') determining a peak in the detected magnetic field, and performing the comparison step (d) in relation to values arising at the peak.

3. A method of monitoring a series of products, comprising the steps of:
   (a) generating an alternating magnetic field in a monitoring zone;
   (b) placing a product in the monitoring zone;
   (c) detecting a magnetic field in the monitoring zone;
   (d) comparing a stored value indicative of an acceptable phase difference with a detected value indicative of a phase difference between the detected and the generated magnetic fields and producing an output signal in dependence upon a result of the comparison, said output signal providing information on both the product in the monitoring zone and any impurities detected therein;
   (e) automatically updating the stored value in dependence upon the detected value if the detected value is indicative of a phase difference that is representative of an acceptable product;
   (f) repeating steps (b) to (e) for a further product;
   further comprising the step of (c') determining a peak in the detected magnetic field, and performing the comparison step (d) in relation to values arising at the peak; and
   further comprising the step of repeating steps (c) to (e) for further peaks arising as a result of the current product before repeating step (b) to (e) for a further product.

4. A method as claimed in claim 3, wherein the detection step two signals are produced indicative of the amplitudes of, respectively, the component of the detected magnetic field which is in phase with the generated magnetic field and the component of the detected magnetic field which is 90° out of phase from the generated magnetic field.

5. A method of monitoring a series of products, comprising the steps of:
   (a) generating an alternating magnetic field in a monitoring zone;
   (b) placing a product in the monitoring zone;
   (c) detecting a magnetic field in the monitoring zone;
   (d) comparing a stored value indicative of an acceptable phase difference with a detected value indicative of a phase difference between the detected and the generated magnetic fields and producing an output signal in dependence upon a result of the comparison, said output signal providing information on both the product being monitored and any impurities detected therein;
   (e) automatically updating the stored value in dependence upon the detected value if the detected value is indicative of a phase difference that is representative of an acceptable product;
   (f) repeating steps (b) to (e) for a further product;
   further comprising the step of (c') determining a peak in the detected magnetic field, and performing the comparison step (d) in relation to values arising at the peak,
   further comprising the step of repeating steps (c) to (e) for further peaks arising as a result of the current product before repeating steps (b) to (e) for a further product;
   wherein in the detection step two signals are produced indicative of the amplitudes of, respectively, the component of the detected magnetic field which is in phase with the generated magnetic field and the component of the detected magnetic field which is 90° out of phase from the generated magnetic field; and further comprising the step of determining which is the larger of the two amplitude signals, and performing the peak determining step in relation to the larger value.

6. A method as claimed in claim 5, wherein in the comparison step two or more stored values indicative of different acceptable phase differences are compared with the detected value or values, and in the updating step a respective one of the stored values is updated.

7. A method as claimed in claim 5, further comprising the preliminary step of placing a plurality of products in the monitoring zone and generating an initial value of the stored value from the values detected for said plurality of products.

8. An apparatus for monitoring a series of products, comprising:
- means for generating an alternating magnetic field in a monitoring zone;
- means for detecting a magnetic field in the monitoring zone;
- means for storing a value;
- means for comparing an output of the detecting means with the stored value and producing a non-zero output signal in dependence upon a result of the comparison for a product containing or not containing an impurity, with the output from the detecting means providing information on both the product and any impurity therein; and
- means for updating the stored value in dependence upon the result of the comparison and the output of the detecting means, the stored value being updated only when an acceptable product is detected.

9. An apparatus for monitoring a series of products, comprising:
- a drive coil;
- an oscillator arranged to produce a drive signal to drive the drive coil to produce an alternating magnetic field in a monitoring zone;
- a search coil in the monitoring zone;
- a quadrature generator arranged to produce a pair of quadrature signals synchronized with the drive signal;
- a phase detector responsive to an output from the search coil and to the quadrature signals and arranged to produce a pair of signals indicative of amplitudes of components of the search coil output signal respectively in phase with and 90° out of phase with the drive signal, said pair of signals providing information on both a product being monitored and any impurity therein;
- an analog-to-digital converter for producing digital values from the pair of component signals;
- a memory for storing a value;
- a digital processor unit arranged and adapted to perform a comparison utilizing said digital values and the value stored in said memory, to output a signal in dependence upon a result of the comparison, and to update the stored value in dependence upon said result of the comparison and the digital component values only when an acceptable product is detected.

10. An apparatus as claimed in claim 9, further comprising a digital filter for filtering the digital component values.

* * * * *